(12) United States Patent
Zakian et al.

(10) Patent No.: US 10,169,007 B1
(45) Date of Patent: Jan. 1, 2019

(54) SERVICE PROVIDER NETWORK INTEGRATED COMPILATION SERVICE AND RUNTIME SYSTEM

(71) Applicant: Amazon Technologies, Inc., Seattle, WA (US)

(72) Inventors: Christopher Samuel Zakian, Seattle, WA (US); William Alexander Strand, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 14/975,499

(22) Filed: Dec. 18, 2015

(51) Int. Cl.
G06F 8/41 (2018.01)
H04L 12/24 (2006.01)
H04L 29/06 (2006.01)

(52) U.S. Cl.
CPC ............ *G06F 8/41* (2013.01); *H04L 41/5051* (2013.01); *H04L 41/5054* (2013.01); *H04L 63/10* (2013.01)

(58) Field of Classification Search
CPC ... G06F 8/40; G06F 8/41; H04L 63/10; H04L 41/50; H04L 41/5041; H04L 41/5051; H04L 41/5054
See application file for complete search history.

(56) References Cited

U.S. PATENT DOCUMENTS

| | | | |
|---|---|---|---|
| 8,832,714 B1 * | 9/2014 | Jenkins | G06F 9/54 719/316 |
| 9,038,094 B2 | 5/2015 | Jenkins et al. | |
| 9,134,980 B1 | 9/2015 | Cabrera et al. | |
| 9,560,214 B1 * | 1/2017 | Phillip | H04M 15/705 |
| 9,813,440 B1 * | 11/2017 | Hoover | H04L 63/1441 |
| 2010/0325569 A1 * | 12/2010 | King | G06F 8/75 715/771 |
| 2013/0160133 A1 * | 6/2013 | Avgerinos | G06F 21/57 726/26 |

(Continued)

OTHER PUBLICATIONS

Web blog: Krumins, Peteris "A Simple LD_PRELOAD Tutorial" [online][retrieved on: Dec. 18, 2015] retrieved from: http://www.catonmat.net/blog/simple-ld-preload-tutorial/ , 6 pages.

Web article: "Class PowerMockito" published by Google, 2015 [online][retrieved on: Dec. 18, 2015] retrieved from: https://powermock.googlecode.com/svn/docs/powermock-1.5/apidocs/org/powermock/api/mockito/PowerMockito.html, 13 pages.

(Continued)

Primary Examiner — Khang Do
(74) Attorney, Agent, or Firm — Lee & Hayes, PC

(57) ABSTRACT

Technologies are disclosed herein for providing a service provider network integrated compilation service and runtime system. In particular, a compilation service is disclosed that provides functionality for modifying program source code at compile time to utilize network services provided by a service provider network. The compilation service can also perform authentication and authorization with the service provider network at compile time, initialize network services in the service provider network for use at compile time, and integrate with the service provider network in other ways at compile time. Program code modified and compiled by the compilation service can be deployed to and executed within the service provider network. The compiled program code can utilize a runtime system that includes one or more runtime managed service clients configured to interact with the network services provided by the service provider network in a memory and network efficient manner.

20 Claims, 8 Drawing Sheets

(56) References Cited

U.S. PATENT DOCUMENTS

2015/0106797 A1\* 4/2015 Balasubramanian ........................ G06F 8/4432
717/153
2017/0003960 A1\* 1/2017 Subramanian ............ G06F 8/76

OTHER PUBLICATIONS

Wikipedia: Common Object Request Broker Architecture: published by Wikipedia, 2015 [online][retrieved on: Dec. 18, 2015] retrieved from: https://en.wikipedia.org/wiki/Common_Object_Request_Broker_Architecture, 11 pages.

Wikipedia: "Distributed Component Object Model" published by Wikipedia, 2015 [online][retrieved on: Dec. 18, 2015] retrieved from: https://en.wikipedia.org/wiki/Distributed_Component_Object_Model, 3 pages.

Web blog: Cieslak, Rafal "Dynamic linker tricks: Using LD_PRELOAD to cheat, inject features and investigate programs" [online][retrieved on: Dec. 18, 2015] retrieved from: https://rafalcieslak.wordpress.com/2013/04/02/dynamic-linker-tricks-using-ld_preload-to-cheat-inject-features-and-investigate-programs/, 9 pages.

Web article: "Introduction to the Spring Framework" published by Spring, 2015 [online][retrieved on: Dec. 18, 2015] retrieved from: http://docs.spring.io/spring/docs/current/spring-framework-reference/html/overview.html, 19 pages.

Wikipedia "Monkey patch" published by Wikipedia, 2015 [online][retrieved on: Dec. 18, 2015] retrieved from: https://en.wikipedia.org/wiki/Monkey_patch, 3 pages.

\* cited by examiner

SERVICE PROVIDER NETWORK INTEGRATED COMPILATION SERVICE AND RUNTIME SYSTEM

BACKGROUND

Service provider networks exist that allow customers to purchase, configure, and utilize various types of computing resources on a permanent or an as-needed basis. In particular, service provider networks can expose network interfaces through which customers can access various types of network services that provide computing resources such as, but not limited to, data processing resources, data storage resources, database resources, networking resources, and data communication resources.

It is not uncommon for the operator of a service provider network such as those described above to provide importable libraries, such as a software development kit ("SDK"), in order to enable third-party developers to create program code that utilizes the various types of network services available from the service provider network. These libraries commonly enable the invocation of remote procedure calls ("RPCs") for accessing network services available in the service provider network.

While service provider supplied libraries can assist software developers in the creation of programs for accessing network services exposed by a service provider network, significant development effort is still typically required in order to access and utilize network services via RPCs as compared to writing program code that uses local procedure calls ("LPCs"). Moreover, libraries such as these that are used to support a single executable might utilize the same network service, but will often create a client connection to the network service in each library. This lack of coordination between libraries can result in multiple network connections to the same service, which can waste system resources and network bandwidth, and which therefore can also negatively impact the performance of both a client system and the called network service.

The disclosure made herein is presented with respect to these and other considerations.

DETAILED DESCRIPTION

Figure 1:
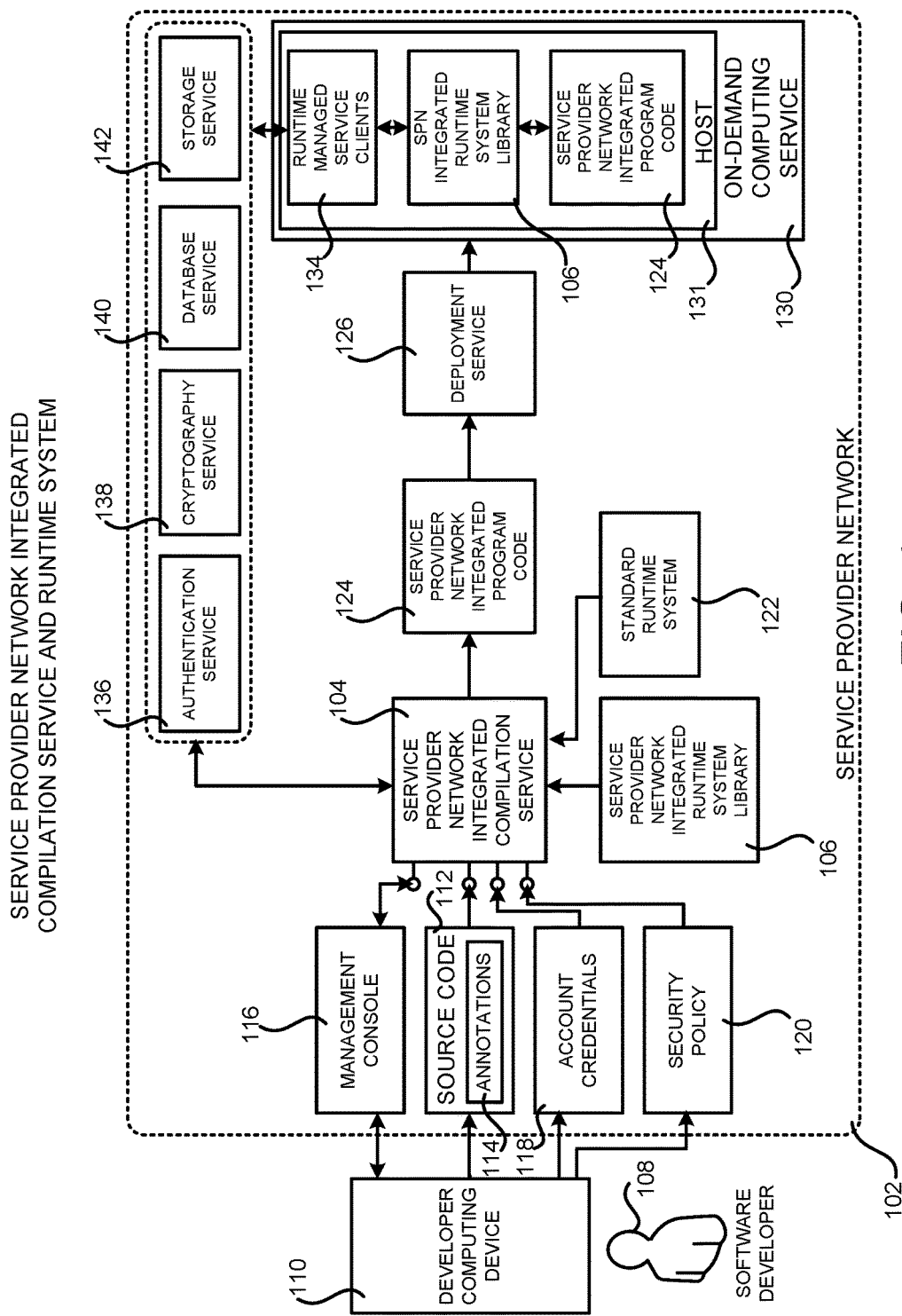
FIG. 1 is a software architecture diagram showing aspects of the configuration and utilization of service provider network integrated compilation service disclosed herein, according to one particular configuration.

The following detailed description is directed to technologies for providing a service provider network integrated compilation service and runtime system. Through an implementation of the disclosed technologies, the service provider network integrated compilation service can modify source code at compile time to replace LPCs or other primitives with source code for accessing and utilizing network services available from a network service provider. Moreover, the service provider network integrated compilation service can perform authentication and authorization with the service provider network at compile time to ensure that the proper access rights to the network services will be available to the compiled program code at run time.

Additionally, a service provider network integrated runtime system library can be utilized at run time to access network services executing in the service provider network. The service provider network integrated runtime system library can provide runtime managed service clients that are configured to manage connections to the network services and, potentially, other aspects of the communication with the network services. Through the optimization of these connections, memory and network bandwidth utilization can be reduced as compared to previous solutions. Technical benefits other than those described briefly above can also be realized through implementations of the technologies disclosed herein.

In order to enable the functionality disclosed herein, a service provider network integrated compilation service (which might be referred to herein as the "compilation service") is provided in one configuration. The compilation service is a network service that executes in a service provider network that is configured to provide computing resources on a permanent or an as-needed basis. Among other types of functionality, the computing resources provided by the service provider network can be utilized to implement the various network services described herein. The computing resources provided by the service provider network can include various types of computing resources, such as data processing resources like virtual machine ("VM") instances, data storage resources, networking resources, data communication resources, network services, and the like.

The compilation service disclosed herein exposes an interface, such as a graphical user interface ("GUI"), a web service application programming interface ("API"), or a command line interface ("CLI"), through which a software developer or other user can submit source code for compilation. For example, and without limitation, source code expressed using the JAVA programming language or the C++ language can be submitted to the compilation service for compilation.

In some configurations, the source code includes annotations indicating that portions of the source code, such as LPCs or other primitives, are to be replaced at compile time with source code for utilizing one or more network services executing in the service provider network. For example, and without limitation, a LPC in the source code, such as a local method or function call, can include a text annotation indicating that the LPC is to be replaced at compile time with source code for utilizing a network service executing in the service provider network. An indication that a portion of source code is to be replaced with source code for utilizing network services in the service provider network can also be provided in other ways within or external to the source code, such as through the use of a management console available through the service provider network.

At compile time of the source code, the compilation service can determine whether a portion of the source code is to be replaced with source code for utilizing one or more network services in the service provider network. For example, and without limitation, the compilation service can identify portions of the source code that have been annotated in the manner described above. If a portion of the source code is to be modified in this manner, the compilation service can generate modified source code by replacing the identified portion of the source code with appropriate source code for utilizing a network service in the service provider network. For example, and without limitation, a LPC for creating or accessing a local file (i.e. a file local to the host upon which the compiled program code is executing) can be replaced with source code for utilizing a storage service in the service provider network to create or access the file. In this manner, a software developer can write source code utilizing conventional LPCs that is modified at compile time to instead utilize network services to perform the same functionality. The LPCs are implemented in one configuration by a standard runtime system utilized by the compilation service, while the service provider network functionality is implemented by a service provider network integrated runtime system library, which is discussed in greater detail below.

Once the compilation service has modified the source code in the manner described briefly above, the compilation service can compile the modified source code to generate executable program code that is integrated with network services executing in the service provider network. The compiled program code might be referred to herein as "service provider integrated program code" or simply "compiled program code." The compiled program code can then be deployed to an execution environment in the service provider network, such as to a physical or virtual host provided by an on-demand computing service executing in the service provider network.

The compilation service can also provide other types of functionality at compile time of the source code for enabling utilization of the network services in the service provider network. For example, and without limitation, the compilation service can receive account credentials from a developer of the source code and utilize the account credentials at compile time to authenticate the developer with the service provider network. The compilation service can also utilize the account credentials to determine whether the developer is authorized to utilize the various network services referenced by the modified source code. In this manner, the compilation service can ensure that the compiled program code will operate as intended at run time. The compilation service can also initialize the various network services at compile time and perform other types of interactions with the utilized network services that would conventionally not be performed until run time.

At run time of the compiled program code, the compiled program code can utilize a service provider network integrated runtime system library (which might be referred to herein simply as the "runtime system" or "the library"). In one configuration, the runtime system includes runtime managed service clients configured to enable access to the network services executing in the service provider network. For example, and without limitation, the compiled program code can utilize the runtime managed service clients to access the network services. The runtime managed service clients can optimize connections to and interaction with the network services. In this way, the runtime managed service clients can reduce the memory and network bandwidth utilization typically required when service provider supplied libraries, such as SDKs, are utilized to access network services in a service provider network.

In one configuration, the source code is annotated with security classifications. For example, and without limitation, methods or function calls in the source code can be annotated to identify a security classification for input data, output data, and/or the security classification for calling methods or functions. In some configurations, the security classification for inputs or outputs of a method that has not been annotated with security classifications can be inferred based upon a security classification associated with a called or calling method. The security classifications for a particular method can also be inferred in other ways in other configurations.

A security policy can also be received from the developer or another user. The compilation service can utilize the security policy and the security classifications in the source code to enforce the security policy. For example, and without limitation, the annotations for a method might indicate that the method outputs high security data, and the security policy might indicate that all high security data is to be encrypted. In this example, the compilation service can enforce the security policy by causing the data output from the method to be encrypted (e.g. at compile time by inserting appropriate source code or at run time by the runtime managed service clients described above). The encryption might be performed locally on the host executing the compiled program code or by a network service executing in the service provider network. Additional details regarding the various components and processes described briefly above for providing a service provider network integrated compilation service and runtime system will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software architecture diagram showing aspects of the configuration and utilization of a service provider network integrated compilation service 104 (which might be referred to herein as the "compilation service 104") disclosed herein, according to one particular configuration. As shown in FIG. 1, the compilation service 104 executes in a service provider network 102 (which might be referred to herein as the "SPN 102") in one particular configuration.

As discussed briefly above, the service provider network 102 is a computing network configured to provide computing resources on a permanent or an as-needed basis. Among other types of functionality, the computing resources provided by the service provider network 102 can be utilized to implement the various network services described herein, such as the compilation service 104. The computing resources provided by the service provider network 102 can include various types of computing resources, such as data processing resources like VM instances, data storage resources, networking resources, data communication resources, network services, and the like.

A customer or potential customer of the service provider network 102, such as the software developer 108, can utilize an appropriate computing system, such as the developer computing device 110, to communicate with the service provider network 102 over an appropriate data communications network (not shown in FIG. 1). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102, such as the developer computing device 110, can be utilized to purchase computing resources in the service provider network 102, to configure aspects of the operation of the computing resources through a management console 116 or other type of interface, to access and utilize functionality provided by the various services and systems described herein, and/or to perform other types of functionality with regard to the operation of the computing resources provided by the service provider network 102.

The developer computing device 110 can be any type of computing device capable of connecting to the service provider network 102 via a suitable data communications network such as, but not limited to, a laptop or desktop computer, a tablet computing device, a server computer, or a smartphone. Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 4-7.

As discussed briefly above, the service provider network 102 can also be configured to execute various types of network services. For example, and without limitation, the service provider network 102 can execute the compilation service 104, the on-demand computing service 130, the authentication service 136, the cryptography service 138, the database service 140, and the storage service 142. Each of these network services will be described in greater detail below.

As discussed briefly above and in greater detail below, the compilation service 104 is a network service that executes in the service provider network 102 in one particular configuration. As shown in FIG. 1, and as also discussed briefly above, the compilation service 104 exposes an interface, such as a GUI, a web service API 112, or a CLI (not shown in FIG. 1), through which a software developer 108 or other user can source code 112 for compilation. For example, and without limitation, source code 112 expressed using the JAVA programming language, the C++ language, or another computer programming language can be submitted to the compilation service 104 for compilation and execution.

In some configurations, the source code 112 includes annotations 114 indicating that portions of the source code 112 are to be replaced at compile time with source code for utilizing one or more network services executing in the service provider network 102. For example, and without limitation, a LPC in the source code 112, such as a local method or function call, can include a text annotation 114 indicating that the LPC is to be replaced at compile time with source code for utilizing a network service executing in the service provider network 102.

An indication that a portion of the source code 112 is to be replaced with source code for utilizing network services in the service provider network 102 can also be provided in other ways within or external to the source code 112, such as through the use of a management console 116 available through the service provider network 102. For example, and without limitation, the management console 116 can provide a web-based interface through which a user can specify the portions of the source code that are to be modified. In one configuration, a "wizard" can be provided that suggests portions of the source code 112 to be modified. The software developer 108 can then make selections regarding the manner in which the source code 112 is to be modified. In other configurations, the modification of the source code 112 occurs automatically without any annotations 114 or other input being provided by the software developer 108. In this manner, source code 112 can be configured and/or optimized for use with the SPN 102 without any user intervention.

At compile time of the source code 112, the compilation service 104 can determine whether a portion of the source code 112 is to be replaced with source code for utilizing one or more network services in the service provider network 102. For example, and without limitation, the compilation service 104 can identify portions of the source code 112 that have been tagged with annotations 114 in the manner described above. If a portion of the source code 112 is to be modified in this manner, the compilation service 104 can generate modified source code by replacing the identified portion of the source code 112 with appropriate source code for utilizing a network service in the service provider network 102. As used herein, the term "compile time" refers to the time at which source code is transformed to machine-specific code.

For example, and without limitation, a LPC in the source code 112 for creating or accessing a local file (i.e. a file that is local to the host upon which the compiled program code is executing) can be replaced with source code for utilizing a storage service 142 in the service provider network 102 to create or access the file. As will be described in greater detail below, the storage service 142 is a network service that provides functionality for block or file-level storage. As another example, a LPC in the source code 112 for creating or accessing a local in-memory array can be replaced with source code for utilizing a storage service 142 or a database service 140 in the service provider network 102 to create or access an array of data. As will also be described in greater detail below, the database service 140 is a network service that provides functionality for creating and utilizing databases.

By replacing LPCs or other primitives in the source code 112 with source code for utilizing network services in an automated fashion, the compilation service 104 disclosed herein enables the software developer 108 to write source code 112 utilizing LPCs or other primitives that is modified at compile time to instead utilize network services provided by the service network 102 to perform the same functionality. The LPCs are implemented in one configuration by a standard runtime system 122 utilized by the compilation service 104. The standard runtime system 122 can, for example, be the standard runtime system provided by the JAVA or C++ programming languages. The standard runtime system 122 can provide functionality for managing a processor stack, allocating memory for local variables, interacting with an operating system, and/or other types of functionality.

In one configuration, the functionality for integrating with the network services in the service provider network 102 is provided by the service provider network integrated runtime system library 106. As will be described in greater detail below, the runtime system 106 provides run time functionality to executable programs for communicating with the network services executing in the service provider network 102. For instance, in one configuration, the runtime system 106 implements one or more runtime managed service clients 134 that are configured to interact with network services executing in the service provider network 102.

The runtime managed service clients 134 can be instantiated and executed at run time of the compiled program code for interacting with the authentication service 136, the cryptography service 138, the database service 140, the storage service 142, the on-demand computing service 130, and/or other network services not specifically described herein. In this regard, it should be appreciated that the compilation service 104 can statically or dynamically link the program code contained in the runtime system 106. Portions of the runtime system 106 can also, or alternately, be separately deployed to a host 131 in the on-demand computing service 130. Additional details regarding the operation of the runtime managed service clients 134 will be provided below.

In some configurations, the compilation service 104 also provides other types of functionality at compile time of the source code 112 for enabling utilization of network services executing in the service provider network 102. For example, and without limitation, the compilation service 104 can receive account credentials 118 (e.g. a username and password) from the developer 108 of the source code 112, and utilize the account credentials 118 at compile time to authenticate the developer 108 with the service provider network 102. In one particular configuration, for instance, the compilation service 104 submits the account credentials 118 to the authentication service 136 at compile time to authenticate the developer 108.

The compilation service 104 can also utilize the account credentials 118 in a similar fashion to determine whether the developer 108 is authorized to utilize the various network services referenced by the source code 112 following modification by the compilation service 104. The account credentials 118 can also be utilized at run time of the compiled program code in order to authenticate and/or authorize the software developer 108.

The compilation service 104 can also initialize the various network services executing in the service provider network 102 at compile time, and perform other types of interactions with the utilized network services that would conventionally be performed at run time. For example, the compilation service 104 can ensure that the proper access rights are available for the compiled program, that any required dependencies are available, and/or that other conditions are satisfied at run time of the compiled program code. As another example, the compilation service 104 can determine at compile time the extent to which an authorized user is authorized to utilize the various services. For example, the compilation service 104 can determine the number of network connections, bandwidth, storage, and/or other types of resources that are available to the user based upon their account credentials 118. Based upon an analysis of the source code 112, the compilation service 104 can then determine whether the available resources will be exceeded at run time of the compiled program code 124. If so, the compilation service 104 can provide an error message to the software developer 108 and/or perform other types of functionality.

In one configuration, the compilation service 104 is configured to inject instrumentation code into the source code 112 prior to compilation. For example, and without limitation, the software developer 108 might specify through the management console 116 that various aspects of the interaction with services in the SPN 102 are to be instrumented. Based on this instruction, the compilation service 104 can insert code into the source code 112 for monitoring and reporting on the specified interaction. When the specified interaction occurs either at compile time or at run time, information about the specified interaction can be recorded and presented to the software developer 108. For example, information might be presented to the software developer 108 through the management console 116 describing the use of the storage service 142 by the program code 124. Other types of code can also be injected by the compilation service 104 in other configurations.

Once the compilation service 104 has modified the source code 112 in the manner described above, the compilation service 104 can compile the modified source code to generate executable service provider network integrated program code 124 (which might be referred to herein as the "compiled program code 124") that is integrated with network services executing in the service provider network 102. The compiled program code 124 can then be deployed to an execution environment in the service provider network, such as to a physical or virtual host 131 provided by an on-demand computing service 130 executing in the service provider network. For example, and without limitation, the compilation service 104 utilizes a deployment service 126 to deploy the compiled program code 124 to a virtual or physical host 131 in the on-demand computing service 130 in one particular configuration. Additional details regarding the compile time operation of the compilation service 104 will be provided below with regard to FIG. 2A.

Once the compiled program code 124 has been deployed to a host 131 in the on-demand computing service 130, the compiled program code 124 can be executed. At run time of the compiled program code 124, the compiled program code 124 can utilize the runtime managed service clients 134 provided by the runtime system 106 to access the various network services executing in the service provider network 102. As described briefly above, the runtime managed service clients 134 can optimize network connections to, and interaction with, the various network services. For example, and without limitation, the runtime managed service clients 134 can obtain data from a network service executing in the service provider network describing the operational status of the service prior to making service calls to the service. The runtime managed service clients 134 can utilize this information to adaptively throttle requests to the service that are received from the program code 124. In this way, for example, service requests can be delayed rather than failing when a network service is under a heavy load.

As another example, the runtime managed service clients 134 can maintain only a single network connection to a corresponding service executing in the service provider network 102 on behalf of multiple programs executing on the same host 131. In this way, the runtime managed service clients 134 can reduce the memory and network bandwidth utilization typically required when service provider supplied libraries, such as SDKs, are utilized to access network services in a service provider network 102. Additional details regarding the run time operation of the program code 124 and the runtime managed service clients 134 will be provided below with regard to FIG. 2B.

In one configuration, the source code 112 includes annotations 114 that define security classifications. For example, and without limitation, methods or function calls in the source code 112 can be annotated to identify a security classification for input data, output data, and/or the security classification for calling methods or functions. In some configurations, the security classification for inputs or outputs of a method that has not been annotated with security classifications can be inferred based upon a security classification associated with a called or calling method. The security classifications for a particular method can also be inferred in other ways in other configurations.

A security policy 120 can also be received from the developer 108 or another user of the service provider network 102. For example, and without limitation, the management console 116 can provide functionality for allowing the software developer 108 to specify the security policy 120. The compilation service 104 can utilize the security classifications in the source code 112 to enforce the security policy 120. For example, and without limitation, the annotations 114 for a method in the source code 112 might indicate that the method outputs high security data, and the security policy 120 might indicate that all high security data is to be encrypted. In this example, the compilation service 104 can enforce the security policy 120 by causing the data output from the method to be encrypted (e.g. at compile time by inserting appropriate source code or at run time by the runtime managed service clients 134 described above).

The encryption might be performed locally on the host 131 executing the compiled program code 124 or using a network service executing in the service provider network 102. A cryptography service 138 executing in the service provider network 102 can be utilized to obtain encryption keys for encrypting the data passed between methods. Additional details regarding the configuration and operation of the cryptography service 139 will be provided below. Additional details regarding the compile time and run time enforcement of a security policy 120 will also be provided below with regard to FIG. 3.

Figure 2A:
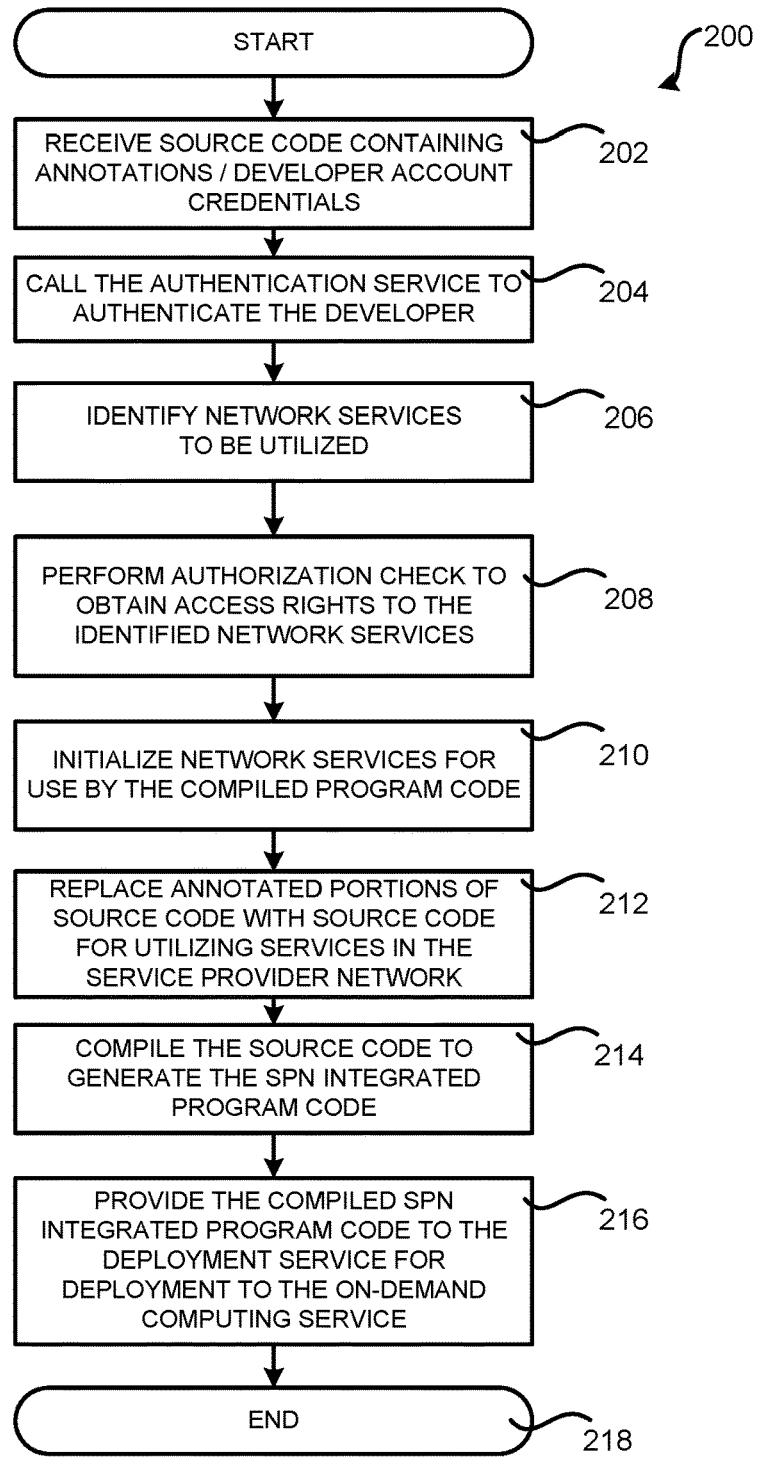
FIG. 2A is a flow diagram showing a routine that illustrates aspects of the operation of the compilation service shown in FIG. 1 for compile time modification of source code to enable service provider network integration, according to one particular configuration.

FIG. 2A is a flow diagram showing a routine 200 that illustrates aspects of the operation of the compilation service 104 shown in FIG. 1 and described above for compile time modification of source code 112 to enable automated integration with services operating in the service provider network 102. It should be appreciated that the logical operations described herein with respect to FIG. 2A, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the compilation service 104 receives source code 112 that includes annotations 114 indicating that portions of the source code 112 are to be replaced at compile time with source code for utilizing one or more network services executing in the service provider network 102. As discussed above, the compilation service 104 can also receive account credentials 118 from the developer 108 of the source code 112. As discussed above, the account credentials 118 can be provided through the management console 116, through a network service API, through a GUI, or in another manner. Once the annotated source code 112 and the account credentials 118 have been received, the routine 200 proceeds from operation 202 to operation 204.

At operation 204, the compilation service 104 utilizes the account credentials 118 at compile time to authenticate the developer 108 with the service provider network 102. In one particular configuration, for instance, the compilation service 104 submits the account credentials 118 to the authentication service 136 at compile time to authenticate the developer 108. If the software developer 108 cannot be authenticated, the compilation service 104 may discontinue its processing following operation 204.

If the software developer 108 is authenticated at operation 204, the routine 200 proceeds to operation 206, where the compilation service 104 identifies the network services in the service provider network 102 that are referenced by the source code 112. As discussed above, the compilation service 104 can utilize the annotations 114 to determine whether a portion of the source code 112 is to be replaced with source code for utilizing one or more network services in the service provider network 102. Other indications within or external to the source code 112 can indicate that network services are to be utilized in place of a LPC or another portion of the source code 112.

Once the network services in the service provider network 102 to be utilized have been identified, the routine 200 proceeds from operation 206 to operation 208, where the compilation service 104 determines whether the software developer 108 has access rights to utilize the network services identified at operation 206. This can be accomplished through communication with the authentication service 136 or another network service configured to maintain data describing the access rights of users, such as the software developer 108. If the software developer 108 is not authorized to utilize a network service, the compilation service 104 may discontinue its processing following operation 208.

If the software developer 108 is authorized to utilize the network services at operation 208, the routine 200 proceeds to operation 210, where the compilation service 104 can initialize the various network services in the service provider network 102 that are to be utilized. The compilation service 104 can also perform other types of interactions with the utilized network services that would conventionally be performed at run time.

From operation 210, the routine 200 proceeds to operation 212, where the compilation service 104 replaces the annotated portions of the source code 112 with appropriate source code for utilizing a network service in the service provider network 102 rather than a LPC or other primitive. As discussed above, the functionality for integrating with the network services in the service provider network 102 can be provided by the runtime system 106.

In one configuration, portions of the source code 112 including program code for accessing a service provider network other than the service provider network 102 can be replaced with source code for accessing similar functionality in the service provider network 102. In this manner, program code originally created for one service provider network can be executing within the service provider network 102 with little or no modification.

Once the compilation service 104 has modified the source code 112 in the manner described above, the routine 200 proceeds from operation 212 to operation 214, where the compilation service 104 compiles the modified source code to generate the compiled program code 124. The routine 200 then proceeds to operation 216, where the compiled program code 124 can be deployed to an execution environment in the service provider network, such as to a physical or virtual host 131 provided by an on-demand computing service 130 executing in the service provider network. As discussed above, the compilation service 104 can utilize a deployment service 126 to deploy the compiled program code 124 to a virtual or physical host 131 in the on-demand computing service 130 in one particular configuration. From operation 216, the routine 200 proceeds to operation 218, where it ends.

Figure 2B:
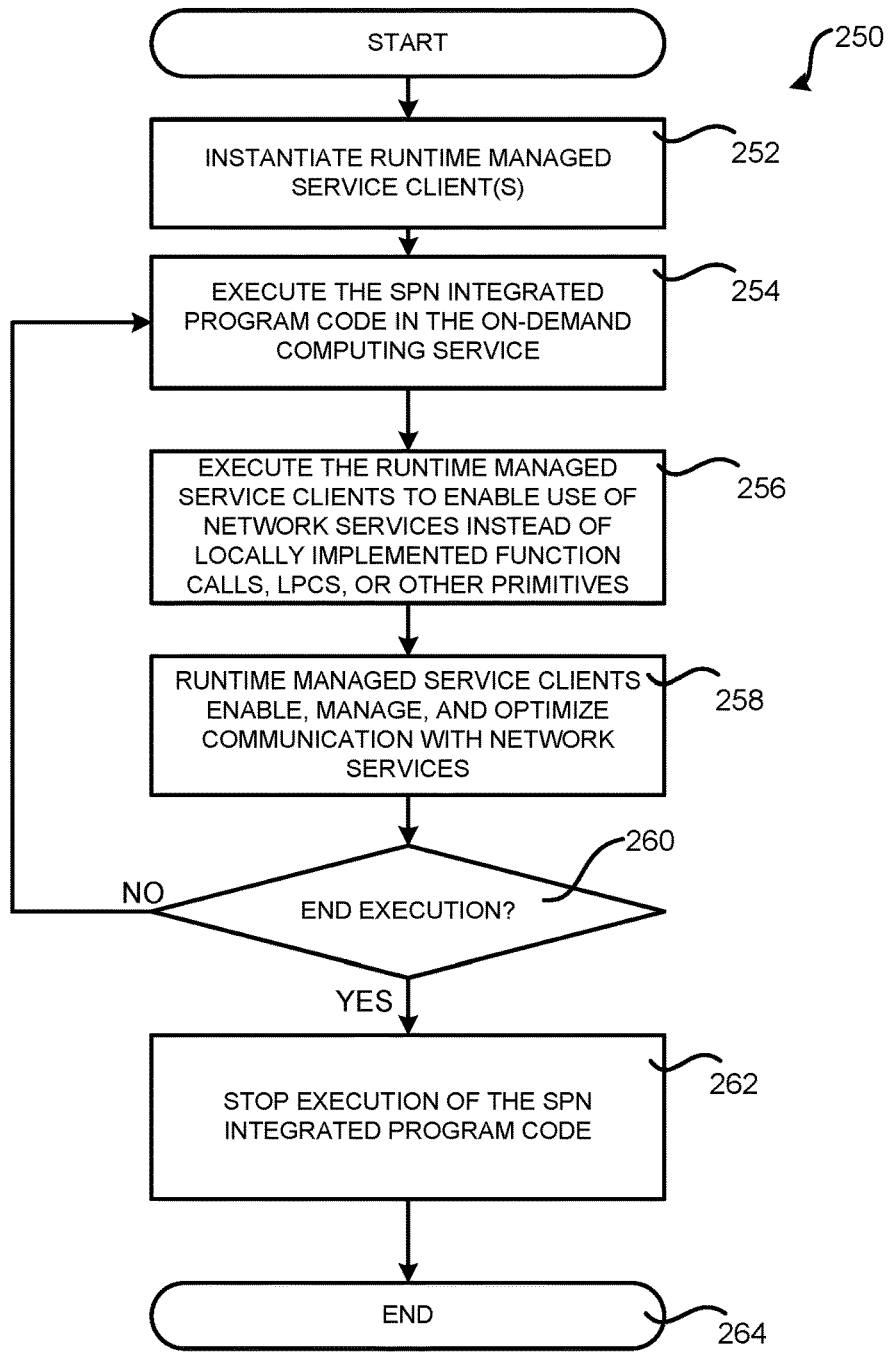
FIG. 2B is a flow diagram showing a routine that illustrates aspects of the operation of a service provider network integrated runtime system library for run time utilization of network services by program code generated by the compilation service shown in FIG. 1, according to one particular configuration.

FIG. 2B is a flow diagram showing a routine 250 that illustrates aspects of the operation of the runtime system 106 for run time utilization of network services by program code 124 generated by the compilation service 104 shown in FIG. 1 and described above. The routine 250 begins at operation 252, where the appropriate service clients 134 can be instantiated on the host 131. Once the service clients 134 have been instantiated, the routine 250 proceeds to operation 254, where the compiled program code 124 can also be executed on the host 124.

From operation 254, the routine 250 proceeds to operation 256, where the runtime managed service clients 134 provided by the runtime system 106 can be utilized to enable the use of the various network services executing in the service provider network 102 instead of LPCs, other primitives in the source code 112, or other arbitrary portions of the source code 112. As described briefly above, the runtime managed service clients 134 can optimize network connections to, and interaction with, the various network services utilized by the compiled program code 124. In this way, the runtime managed service clients 134 can reduce the memory and network bandwidth utilization typically required when service provider supplied libraries, such as SDKs, are utilized to access network services in a service provider network 102. This occurs at operation 258.

From operation 258, the routine 250 proceeds to operation 260, where a determination is made as to whether execution of the compiled program code 124 is to be stopped. If not, the routine 250 proceeds back to operation 254, where execution of the compiled program code 124 and the runtime managed service clients 134 can continue in the manner described above. If execution of the compiled program code 124 is to be stopped, the routine 250 proceeds to operation 262, where execution of the compiled program code 124 can be halted. In this regard, it should be appreciated that the runtime managed service clients 134 can continue executing on the host 131 in order to assist other program code executing on the host 131 with communications to and from the network services in the service provider network 102. From operation 262, the routine 250 proceeds to operation 2643, where it ends.

It should be appreciated that while the configurations disclosed herein are primarily presented in the context of replacing source code 112 with source code configured to utilize network services executing in the SPN 102 at compile time, other types of modifications to the source code 112 can be made in other configurations. For example, and without limitation, source code 112 that is configured for use with network services in the SPN 102 can be replaced with code that has been optimized for use with the same services or that satisfies coding best practices for integrating with the network services. In this regard, it is to be appreciated that the compilation service 104 can also replace portions of the source code 112 at compile time with source code that has been configured in other ways for executing within or in conjunction with the SPN 102.

Figure 3:
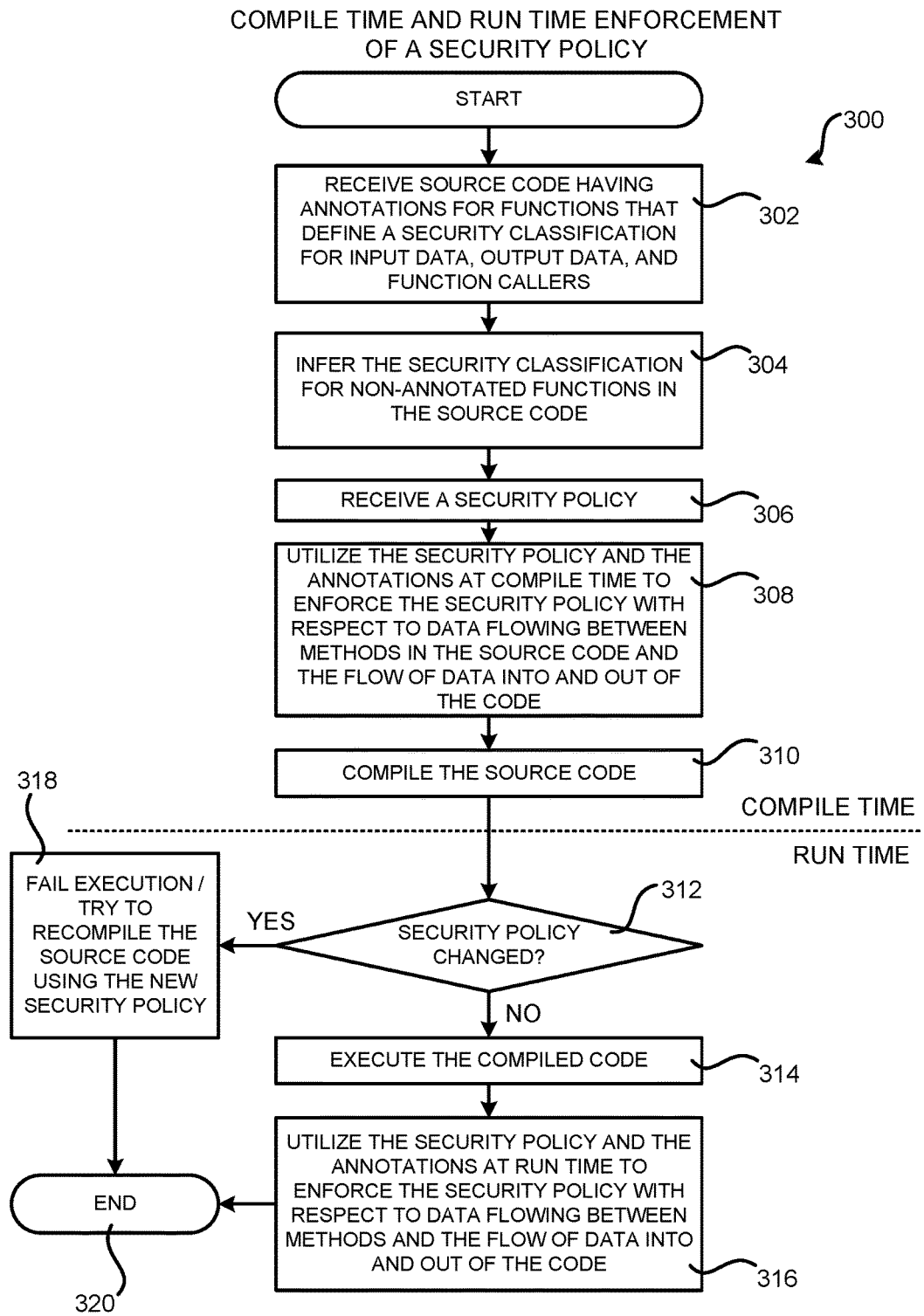
FIG. 3 is a flow diagram showing a routine that illustrates aspects of the operation of the compilation service and the runtime system shown in FIG. 1 for compile time and run time enforcement of a security policy, according to one particular configuration.

FIG. 3 is a flow diagram showing a routine 300 that illustrates aspects of the operation of the compilation service 104 and the runtime system 106 shown in FIG. 1 and described above for compile time and run time enforcement of a security policy 120, according to one particular configuration. The routine 300 begins at operation 302, where source code 112 is received that includes annotations 114 that define security classifications. As discussed above, for example, methods or function calls in the source code 112 can be annotated to identify a security classification for input data, output data, and/or the security classification for calling methods or functions. In some configurations, the security classification for inputs or outputs of a method in the source code 112 that has not been annotated with security classifications can be inferred based upon a security classification associated with a called or calling method. This occurs at operation 304.

From operation 304, the routine 300 proceeds to operation 306, where a security policy 120 can also be received from the developer 108 or another user of the service provider network 102. As discussed above, for example, the management console 116 can provide functionality for allowing the software developer 108 to specify the security policy 120.

Once the security policy 120 has been received, the routine 300 proceeds from operation 306 to operation 308, where the compilation service 104 can utilize the security classifications in the source code 112 to enforce the security policy 120 with respect to the flow of data between methods in the compiled program code 124 at compile time. As discussed above, for example, the compilation service 104 or the runtime system 106 can enforce the security policy 120 by causing the data output from a method annotated with a security classification to another method to be encrypted (e.g. at compile time by inserting appropriate source code for encrypting the data). The compilation service 104 can also utilize the security classifications in the source code 112 to enforce the security policy 120 with respect to the flow of data into and out of the compiled program code 124. As also discussed above, encryption and decryption might be performed locally on the host 131 executing the compiled program code 124 using encryption keys obtained from a network service executing in the service provider network 102. The cryptography service 138 can be utilized to obtain encryption keys for encrypting or decrypting the data passed between methods in order to enforce the security policy 120 in one configuration.

The routine 300 proceeds from operation 308 to operation 310, where the compilation service 104 compiles the source code 112. When a request is received to execute the compiled code 124, the routine 300 proceeds from operation 310 to operation 312, where the runtime system 106 can determine whether the security policy 120 utilized at compile time has changed. If the security policy has changed since compile time, the routine 300 proceeds from operation 312 to operation 318, where the execution of the compiled code 124 may be prohibited. In other configurations, the compilation service 104 can attempt to recompile the source code 112 using the updated security policy 120. Other actions can also, or alternately, be taken in response to determining at run time that a security policy has changed since compile time.

If the security policy 120 has not changed since compile time, the routine 300 proceeds from operation 312 to operation 314 where the program code 124 can be executed in the manner described above. The routine 300 then proceeds from operation 314 to operation 316, where the runtime system 106 can utilize the security classifications in the source code 112 to enforce the security policy 120 with respect to the flow of data between methods in the compiled program code 124 and into and out of the compiled program code 124. As discussed above, for example, the runtime system 106 can enforce the security policy 120 by causing data output from the program code 124 to be encrypted in the manner described above. From operations 316 and 318, the routine 300 proceeds to operation 320, where it ends.

Figure 4:
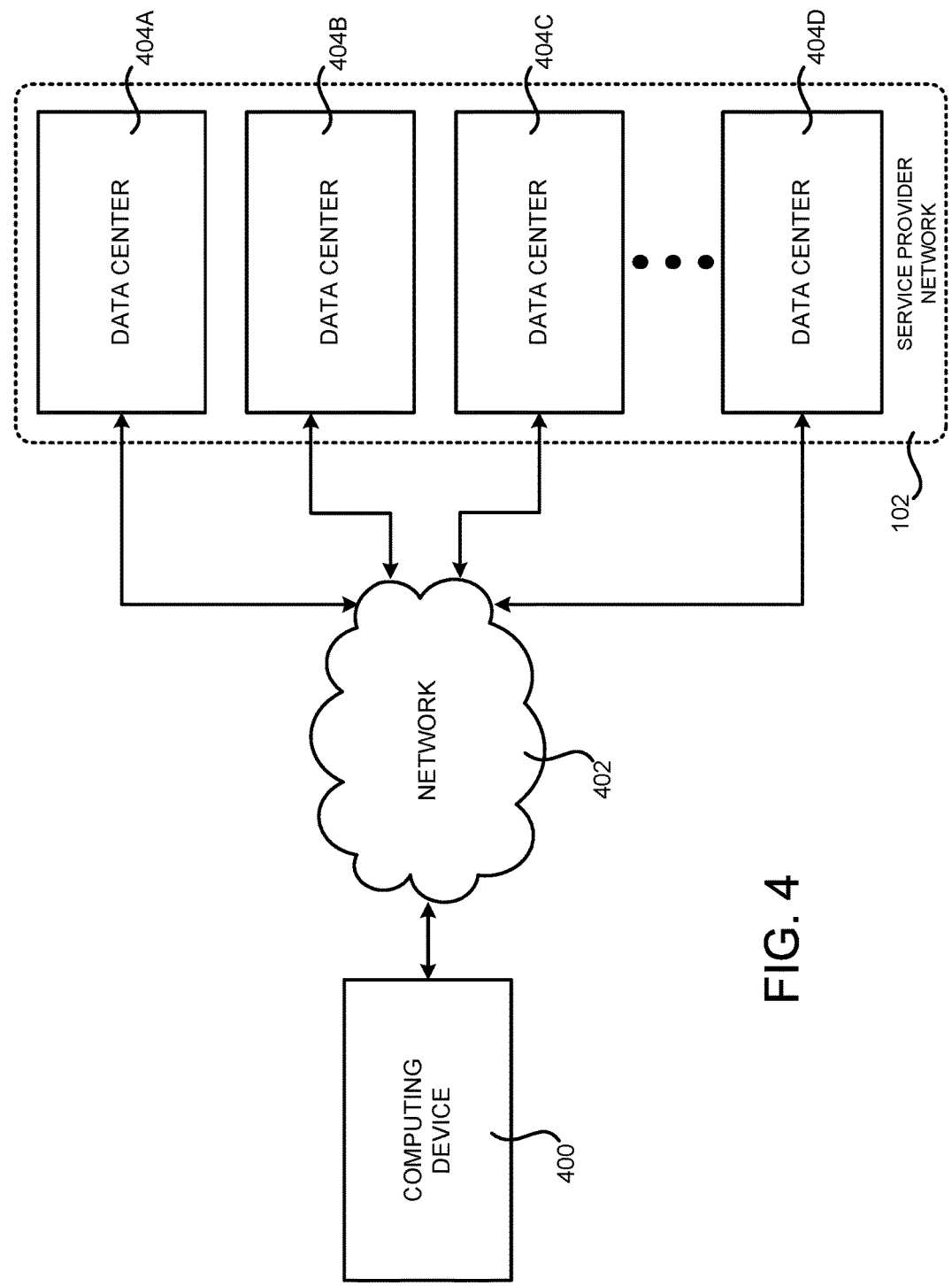
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 102 that can be configured to execute the compilation service 104 and the runtime system 106 in the manner described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data processing resources, such as VM instances, data storage resources, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

As also discussed above, the computing resources provided by the service provider network 102 are enabled in one implementation by one or more data centers 404A-404D (which might be referred herein singularly as "a data center 404" or collectively as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The customers and other users of the service provider network 102 can access the computing resources provided by the service provider network 102 over a network 402, which can be a wide area communication network ("WAN"), such as the Internet, an intranet or an Internet service provider ("ISP") network or a combination of such networks. For example, and without limitation, a computing device 400 operated by a customer or other user of the service provider network 102, such as the developer computing device 110, can be utilized to access the service provider network 102 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
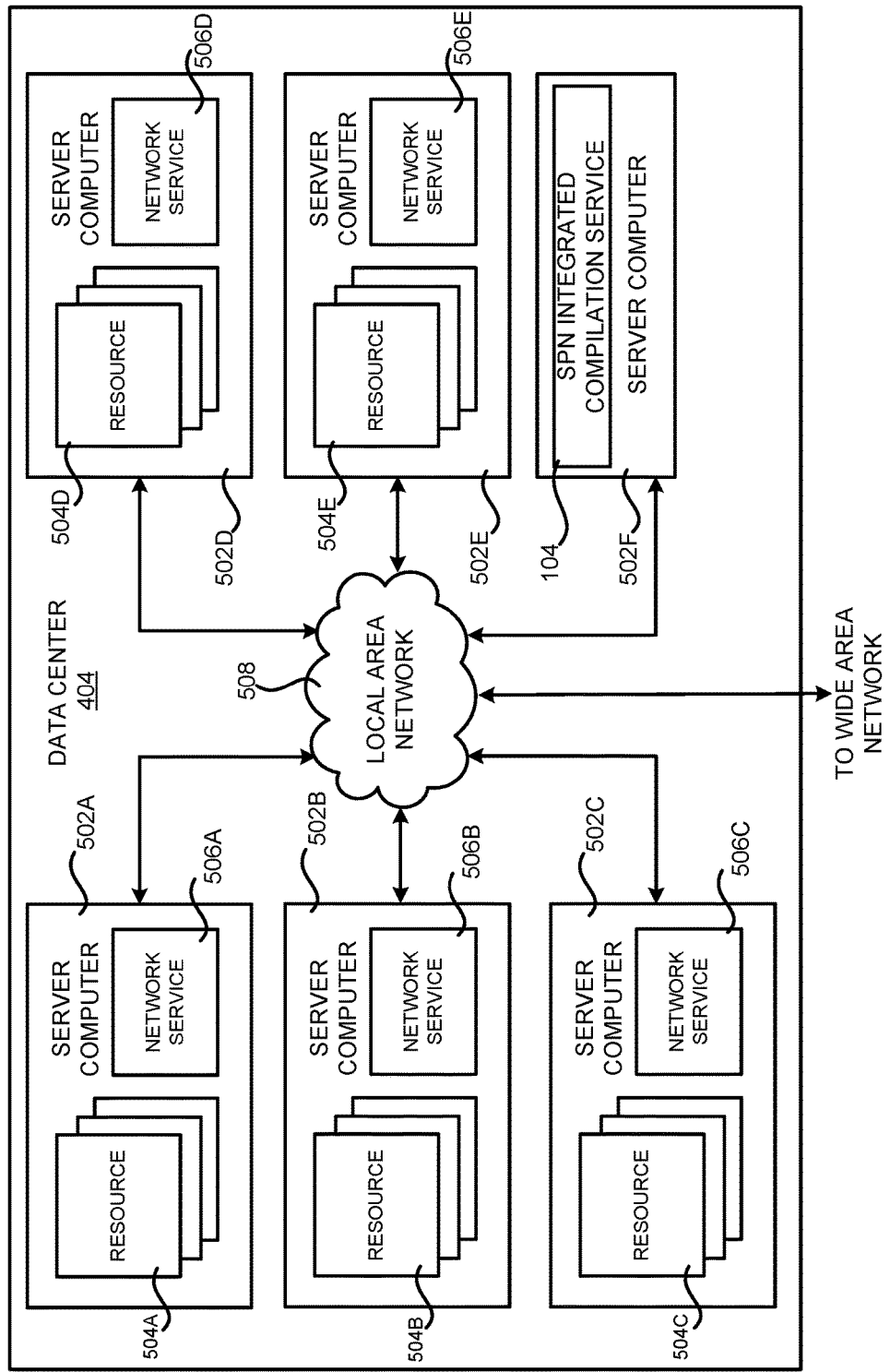
FIG. 5 is a computing system diagram illustrating a configuration for a data center that can be utilized to implement aspects of the technologies disclosed herein.

FIG. 5 is a computing system diagram that illustrates one configuration for a data center 404 that can be utilized to implement the compilation service 104, the runtime system 106, and the other services disclosed herein. The example data center 404 shown in FIG. 5 includes several server computers 502A-502F (which might be referred to herein singularly as "a server computer 502" or in the plural as "the server computers 502") for providing the computing resources 504A-504E.

The server computers 502 can be standard tower, rackmount, or blade server computers configured appropriately for providing the various computing resources described herein (illustrated in FIG. 5 as the computing resources 504A-504E). As mentioned above, the computing resources 504 provided by the service provider network 102 can be data processing resources such as VM instances or hardware computing systems, data storage resources, database resources, networking resources, and others. Some of the servers 502 can also be configured to execute network services 506A-506E, respectively, capable of instantiating, providing and/or managing the computing resources 504, some of which are described in detail below with regard to FIG. 6.

The data center 404 shown in FIG. 5 also includes a server computer 502F that can execute some or all of the software components described above. For example, and without limitation, the server computer 502F can be configured to execute the compilation service 104, the runtime system 106, the service clients 134, and the program code 124, which were described in detail above. The server computer 502F can also be configured to execute other components and/or to store data for providing some or all of the functionality described herein. In this regard, it should be appreciated that components or different instances of the compilation service 104 can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 404A-404D, between each of the server computers 502A-502F in each data center 404, and, potentially, between computing resources 504 in each of the data centers 404. It should be appreciated that the configuration of the data center 404 described with reference to FIG. 5 is merely illustrative and that other implementations can be utilized.

Figure 6:
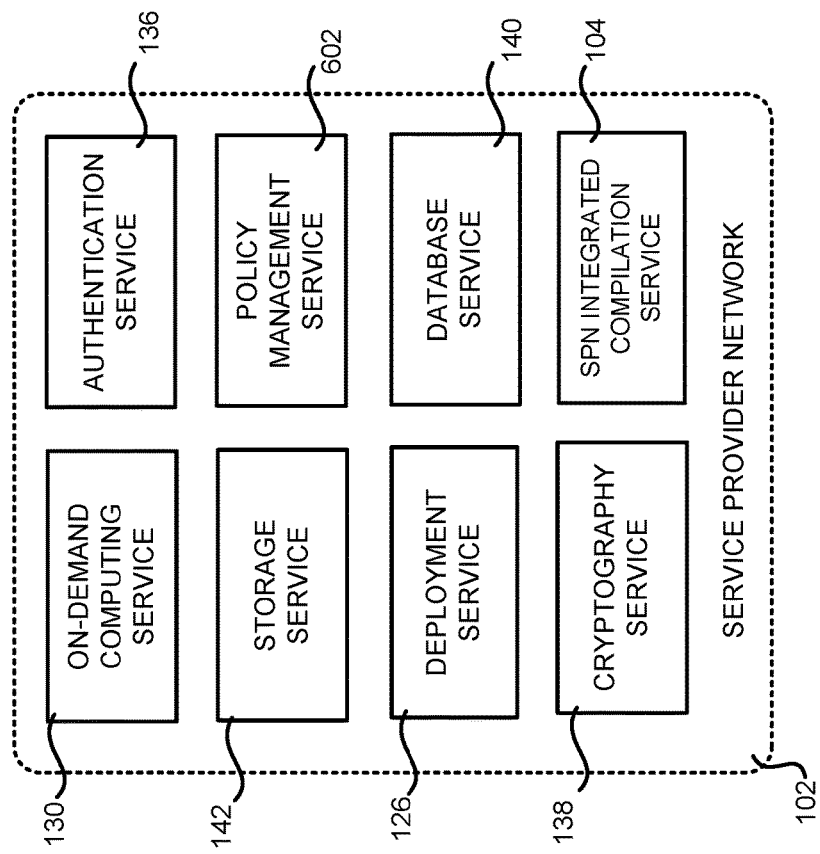
FIG. 6 is a network services diagram that shows aspects of several services that can be provided by and utilized within a service provider network configured to implement the various technologies disclosed herein.

FIG. 6 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the compilation service 104, the authentication service 136, the cryptography service 138, the deployment service 126, the database service 140, the storage service 142, and the on-demand computing service 130. The service provider network 102 can also provide other types of services including, but not limited to, a policy management service 602, which is described in greater detail below. Additionally, the service provider network 102 can also provide other types of network services, some of which are also described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 402 shown in FIG. 4. Communications from a customer computing device, such as the developer computing device 110 shown in FIG. 1, to the service provider network 102 can cause the services provided by the service provider network 102 to operate in accordance with the described configurations or variations thereof.

It is noted that not all configurations described include the services described with reference to FIG. 6 and that additional network services can be provided in addition to or as an alternative to the services explicitly described herein. Each of the services shown in FIG. 6 can also expose web service interfaces that enable a caller to submit appropriately configured API calls to the various services through web service requests. The various web services can also expose GUIs, CLIs, and/or other types of interfaces for accessing the functionality that they provide. In addition, each of the services can include service interfaces that enable the services to access each other (e.g., to enable a virtual computer system provided by the on-demand computing service 130 to store data in or retrieve data from the data storage service 142). Additional details regarding some of the services shown in FIG. 6 will now be provided.

As discussed above, the on-demand computing service 130 can be a collection of computing resources configured to instantiate VM instances and to provide other types of computing resources 504 on demand. For example, a customer or other user of the service provider network 102 can interact with the on-demand computing service 130 (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the customer.

Other applications for the VM instances can be to support database applications, electronic commerce applications, business applications and/or other applications. Although the on-demand computing service 130 is shown in FIG. 6, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The storage service 142 can include software and computing resources that collectively operate to store data using block or file-level storage devices (and/or virtualizations thereof). The storage devices of the storage service 142 can, for example, be operationally attached to virtual computer systems provided by the on-demand computing service 130 to serve as logical units (e.g., virtual drives) for the computer systems. A storage device can also enable the persistent storage of data used/generated by a corresponding virtual computer system where the virtual computer system service can only provide ephemeral data storage.

The service provider network 102 can also include a cryptography service 138. The cryptography service 138 can utilize storage services of the service provider network 102, such as the storage service 142, to store encryption keys in encrypted form, whereby the keys can be usable to decrypt customer keys accessible only to particular devices of the cryptography service 138. The cryptography service 138 can also provide other types of functionality not specifically mentioned herein.

As illustrated in FIG. 6 and discussed above, the service provider network 102, in various configurations, also includes an authentication service 136 and a policy management service 602. The authentication service 136, in one example, is a computer system (i.e., collection of computing resources 504) configured to perform operations involved in authentication of users. For instance, one of the services shown in FIG. 6 can provide information from a user to the authentication service 136 to receive information in return that indicates whether or not the requests submitted by the user are authentic.

The policy management service 602, in one example, is a network service configured to manage policies on behalf of customers or internal users of the service provider network 102. The policy management service 602 can include an interface that enables customers to submit requests related to the management of policy, such as the security policy 120. Such requests can, for instance, be requests to add, delete, change or otherwise modify policy for a customer, service, or system, or for other administrative actions, such as providing an inventory of existing policies and the like.

The service provider network 102 can additionally maintain other services based, at least in part, on the needs of its customers. For instance, the service provider network 102 can maintain the deployment service 126 for deploying program code and/or the database service 140 in some configurations. As discussed briefly above, the deployment service 126 provides functionality for deploying program code, such as to hosts 131 in the on-demand computing service 130. As also discussed briefly above, the database service 140 can be a collection of computing resources that collectively operate to create, maintain, and allow queries to be performed on databases stored within the service provider network 102. For example, a customer or other user of the service provider network 102 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 102 can also be configured with other network services not specifically mentioned herein in other configurations.

Figure 7:
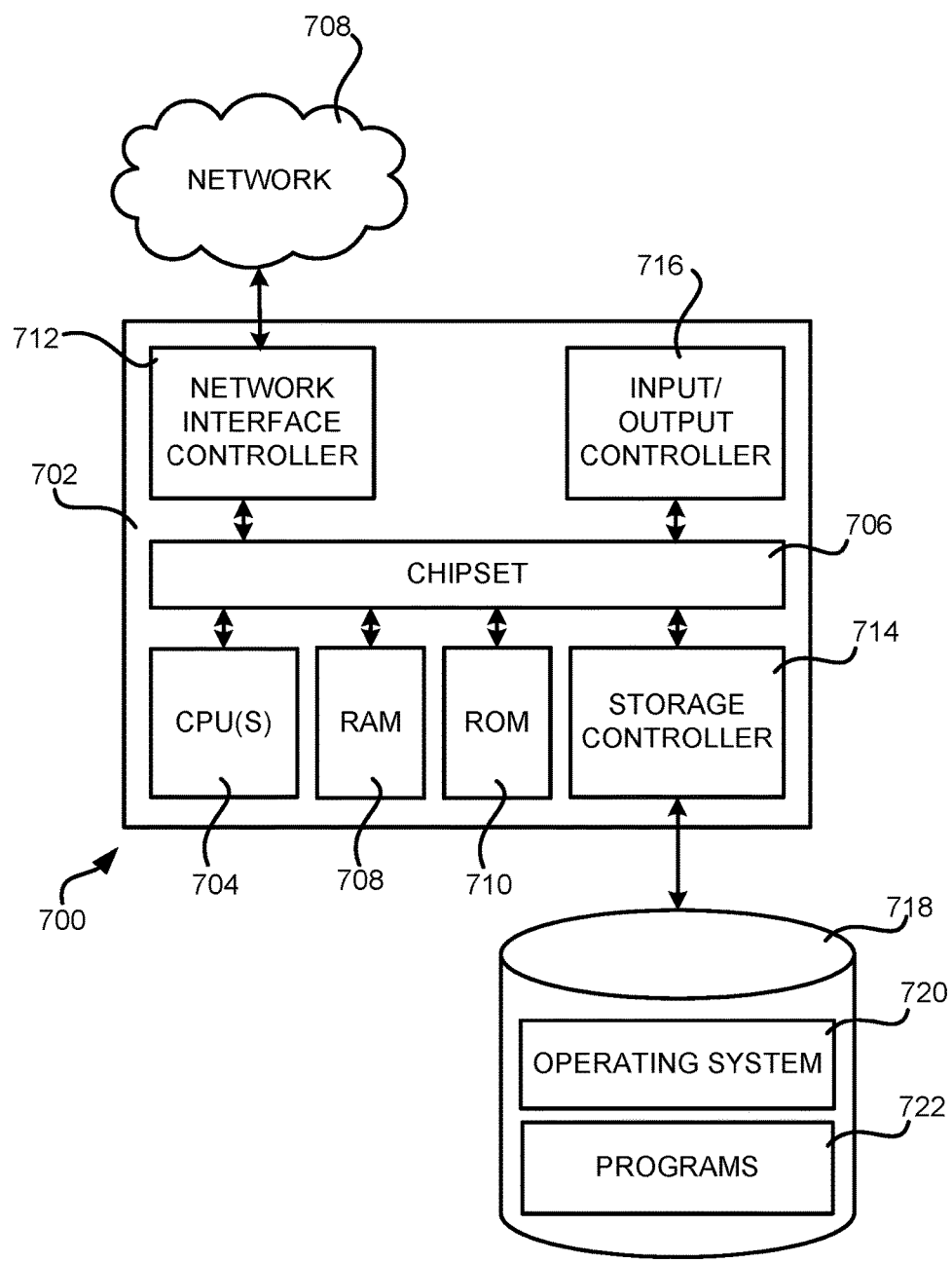
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for implementing a service provider network integrated compilation service and runtime system have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   a processor; and
   a non-transitory computer-readable storage medium having instructions stored thereupon which are executable by the processor and which, when executed, cause the apparatus to:
   execute a compilation service in a service provider network;
   receive source code to be compiled at the compilation service;
   determine, at a compile time of the source code, whether a local procedure call, for creating or accessing a local file, in the source code is to be replaced to utilize one or more network services executing in the service provider network;
   in response to determining that the local procedure call in the source code is to be replaced, generate modified source code by replacing the local procedure call with new source code for utilizing the one or more network services executing in the service provider network;
   compile the modified source code to generate service provider network integrated program code;
   cause the service provider network integrated program code to be deployed to an on-demand computing service executing in the service provider network; and
   cause the service provider network integrated program code to be executed on a host in the on-demand computing service, whereby the service provider network integrated program code utilizes one or more runtime managed service clients at a run time to utilize the one or more network services executing in the service provider network.

2. The apparatus of claim 1, wherein determining whether the local procedure call in the source code is to be replaced to utilize the one or more network services executing in the service provider network comprises determining whether the local procedure call in the source code includes an annotation indicating that the local procedure call in the source code is to be replaced with the new source code for utilizing the one or more network services.

3. The apparatus of claim 1, wherein determining whether the local procedure call in the source code is to be replaced to utilize the one or more network services executing in the service provider network comprises determining whether an indication has been received by way of a management console in the service provider network that the local procedure call in the source code is to be replaced with the new source code for utilizing the one or more network services.

4. The apparatus of claim 1, wherein the non-transitory computer-readable storage medium has further instructions stored thereupon to:
   receive, at the compilation service, account credentials for the service provider network; and utilize the account credentials at the compile time of the source code to authenticate a user associated with the source code with the service provider network.

5. The apparatus of claim 1, wherein the source code is annotated with one or more security classifications, and wherein the non-transitory computer-readable storage medium has further instructions stored thereupon to:
receive a security policy at the compilation service; and
utilize the one or more security classifications at the compile time of the source code to enforce the security policy.

6. A computer-implemented method for utilizing one or more network services executing in a service provider network, the method comprising:
receiving source code to be compiled at a compilation service executing in the service provider network;
determining, at a compile time of the source code, whether a local procedure call, for creating or accessing a local file, in the source code is to be replaced for execution in the service provider network;
responsive to determining that the local procedure call in the source code is to be replaced, generating modified source code at the compile time of the source code by replacing the local procedure call in the source code with new source code configured for use with the service provider network; and
compiling the modified source code to generate service provider network integrated program code.

7. The computer-implemented method of claim 6, further comprising causing the service provider network integrated program code to be executed in the service provider network, and wherein the service provider network integrated program code utilizes one or more runtime managed service clients at a run time to utilize the one or more network services executing in the service provider network.

8. The computer-implemented method of claim 6, wherein determining, at the compile time of the source code, whether the local procedure call in the source code is to be modified to execute in the service provider network comprises determining whether the local procedure call in the source code includes an annotation indicating that the local procedure call in the source code is to be replaced with the new source code for utilizing the one or more network services.

9. The computer-implemented method of claim 6, wherein determining whether the local procedure call in the source code is to be modified for execution in the service provider network comprises determining whether an indication has been received by way of a management console in the service provider network that the local procedure call in the source code is to be replaced with the new source code for utilizing the one or more network services.

10. The computer-implemented method of claim 6, further comprising:
receiving, at the compilation service, account credentials for the service provider network; and
utilizing the account credentials at the compile time of the source code to authenticate a user associated with the source code with the service provider network.

11. The computer-implemented method of claim 6, further comprising initializing the one or more network services at the compile time of the source code.

12. The computer-implemented method of claim 6, wherein the source code is annotated with one or more security classifications, and wherein the method further comprises:
receiving a security policy at the compilation service; and
utilizing the one or more security classifications at the compile time of the source code to enforce the security policy.

13. The computer-implemented method of claim 12, wherein utilizing the one or more security classifications at the compile time of the source code to enforce the security policy comprises causing data input to or output from a method in the source code to be encrypted.

14. The computer-implemented method of claim 12, further comprising:
inferring a security classification for one or more inputs or outputs of a first method in the source code based upon a security classification associated with a second method in the source code, the second method being called by the first method.

15. A non-transitory computer-readable storage medium having instructions stored thereupon which are executable by a processor and which, when executed, cause the processor to:
receive source code to be compiled at a compilation service executing in the service provider network;
determine, at a compile time of the source code, whether a local procedure call, for creating or accessing a local file, in the source code is to be replaced for execution in the service provider network;
in response to determining that the local procedure call in the source code is to be replaced, generate modified source code from the source code by replacing the local procedure call in the source code with new source code configured for use with the service provider network; and
compile the modified source code to generate service provider network integrated program code.

16. The non-transitory computer-readable storage medium of claim 15, having further instructions stored thereupon to cause the service provider network integrated program code to be executed in the service provider network, and wherein the service provider network integrated program code utilizes one or more runtime managed service clients at a run time of the service provider network integrated program code to utilize the one or more network services executing in the service provider network.

17. The non-transitory computer-readable storage medium of claim 15, wherein determining, at the compile time of the source code, whether the local procedure call in the source code is to be modified for execution in the service provider network comprises determining whether the local procedure call in the source code includes an annotation indicating that the local procedure call in the source code is to be replaced with the new source code for utilizing one or more network services executing in the service provider network.

18. The non-transitory computer-readable storage medium of claim 15, having further instructions stored thereupon to:
receive, at the compilation service, account credentials for the service provider network; and
utilize the account credentials at the compile time of the source code to authenticate a user associated with the source code with the service provider network.

19. The non-transitory computer-readable storage medium of claim 15, wherein the source code is annotated with one or more security classifications, and wherein the non-transitory computer-readable storage medium has further instructions stored thereupon to:
receive a security policy at the compilation service; and
utilize the one or more security classifications at the compile time of the source code to enforce the security policy.

20. The non-transitory computer-readable storage medium of claim 19, wherein utilizing the one or more security classifications at the compile time of the source code to enforce the security policy comprises causing data input to or output from a method in the source code to be encrypted.

\* \* \* \* \*